No. 650,663. Patented May 29, 1900.
F. W. WHITCHER.
TRUCK FOR TRANSPORTING BICYCLES.
(Application filed Feb. 23, 1900.)

(No Model.) 2 Sheets—Sheet 1.

Witnesses: Inventor:
Oscar F. Hill Frank W. Whitcher
 by Macleod Calver & Randall
   his Attorneys.

No. 650,663. Patented May 29, 1900.
F. W. WHITCHER.
TRUCK FOR TRANSPORTING BICYCLES.
(Application filed Feb. 23, 1900.)
(No Model.) 2 Sheets—Sheet 2.

Witnesses:
Oscar F. Hill
Alice H. Morrison

Inventor:
Frank W. Whitcher
By Macleod Calver & Randall
his Attorneys.

THE NORRIS PETERS CO., PHOTO-LITHO., WASHINGTON, D. C.

UNITED STATES PATENT OFFICE.

FRANK W. WHITCHER, OF BOSTON, MASSACHUSETTS.

TRUCK FOR TRANSPORTING BICYCLES.

SPECIFICATION forming part of Letters Patent No. 650,663, dated May 29, 1900.

Application filed February 23, 1900. Serial No. 6,248. (No model.)

*To all whom it may concern:*

Be it known that I, FRANK W. WHITCHER, a citizen of the United States, residing at Boston, in the county of Suffolk, State of Massachusetts, have invented a certain new and useful Improvement in Trucks for the Transportation of Bicycles, of which the following is a specification, reference being had therein to the accompanying drawings.

Much inconvenience is experienced at railway-stations in shifting bicycles to and from trains. Frequently it occurs that a considerable number of bicycles has to be loaded onto a car or unloaded therefrom. The work of shifting them to the train from the room or place wherein they have been stored, or vice versa, is slow and tedious. At present it is customary for an employee to push two bicycles at a time along on their own wheels from one place to another, and consequently the operation of shifting any fairly-large number of bicycles necessitates a great many trips back and forth and occupies a considerable amount of time. In order to effect reasonably-quick work, it is necessary for a number of persons to assist in the work; but even then annoying delays in the starting of trains result in consequence of the amount of time which necessarily is consumed in making the shifts of the bicycles.

The object of the invention is to provide means for facilitating the shifting of bicycles for short distances from one point to another in railway-stations and elsewhere which shall enable any desired number of bicycles to be moved at a time and which shall also serve as a convenient means of storing bicycles temporarily in compact manner, while keeping them in condition, facilitating ready access to the same, as well as providing for the ready removal of any desired bicycle.

The invention consists in the truck which I will now proceed to describe with the aid of the accompanying drawings, in which latter I have illustrated an embodiment of the invention.

Figure 1:
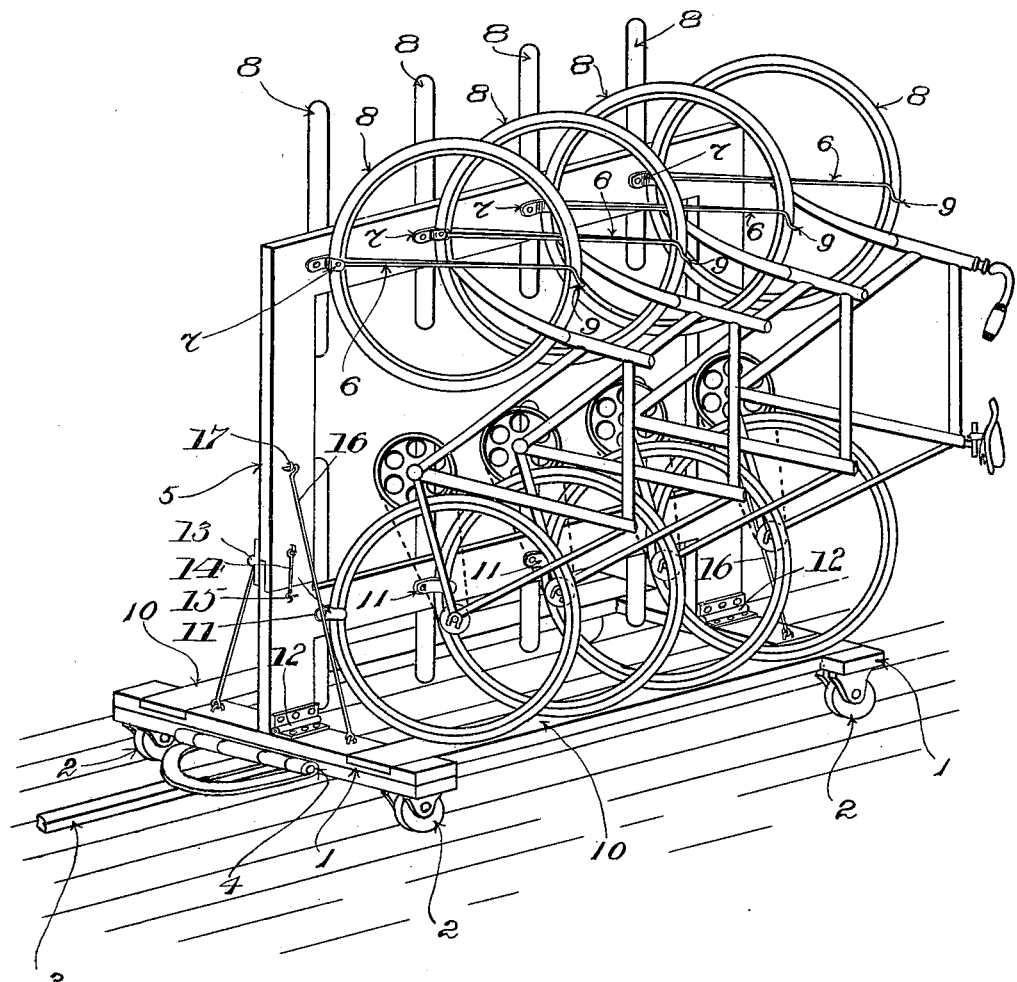
Figure 2:
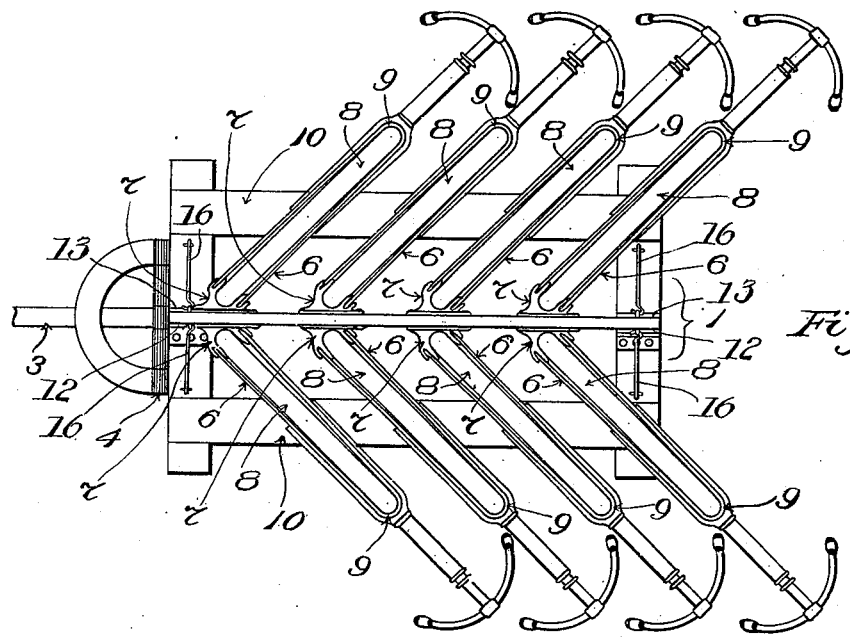
Figure 3:
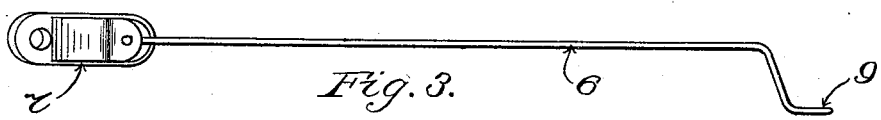
Figure 4:
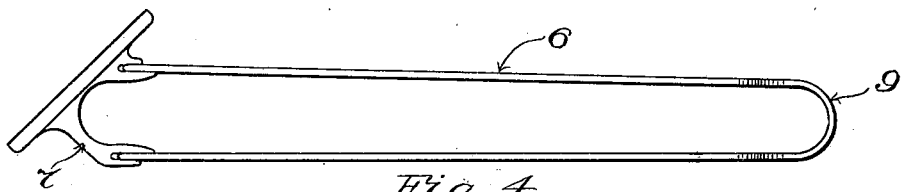
Figure 6:
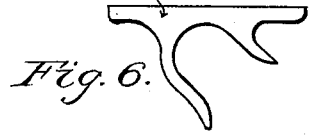
Figure 5:

In the drawings, Figure 1 shows in isometric a truck embodying the invention and having two series of bicycles supported thereon. Certain portions of the respective bicycles are omitted in order to simplify the drawing. Fig. 2 is a view in plan of the truck and bicycles of Fig. 1. Fig. 3 shows in side elevation, and Fig. 4 shows in plan, one of the upper bicycle-holders which are applied to the truck in Figs. 1 and 2. Fig. 5 shows in side elevation, and Fig. 6 shows in plan, one of the lower bicycle-holders which are applied to the said truck.

Having reference to the drawings, 1 designates the base of the truck. It may be of any suitable form or construction and is supported at any convenient height above the ground or floor upon which it rests by wheels or rollers 2 2, upon which latter it may be moved readily from point to point.

3 designates a suitable handle or shaft for use in pulling or pushing the truck about, the same being hinged to the base of the truck at 4.

5 is an upright support with which the truck is provided, it rising in the present instance from the said base to a height nearly equal to the length of a bicycle. To this upright support are applied the holders for the number of bicycles which the truck is designed to support and carry at one time. Bicycle-holders are fitted to one or both sides of the said upright support, according as it is desired to provide for supporting and carrying one or two series of bicycles on the truck. In the present instance I have arranged for two series of bicycles, and accordingly the support 5 is diposed at mid-width of the truck and bicycle-holders are applied to opposite sides thereof. Figs. 1 and 2 show the bicycles arranged on both sides of the support. I arrange the bicycle-holders on the support 5 in a manner which will enable them to retain each bicycle in an up-ended position, with one wheel thereof directly above the other and with the bicycles of a series all parallel with one another. Thereby the length of the bicycle will be directed vertically, and the truck will not require to be made so large in plan as it would if the bicycles were permitted to occupy thereon their customary position. The bicycle-holders also are positioned to support the bicycles in a transversely-inclined position, so that the projecting handle-bars and cranks of adjacent bicycles shall overlap and not come in contact with one another. This permits the bicycles to be placed closer together in a series than otherwise would be possible, thereby enabling the greatest number thereof to be supported in place upon a truck of a given length.

An important feature of the bicycle-holders is a device for engaging with an elevated portion of an up-ended bicycle to thereby maintain the bicycle in its up-ended position on the truck. Herein I have shown for each bicycle an elevated loop or bail, as 6, which receives within it the elevated front wheel 8 of an up-ended bicycle. By means of the said loop or bail the bicycle is sustained in its up-ended position. When in use, the loop or bail projects out from support 5 at an angle. In order to enable the said loop or bail to be turned in out of the way when it is not in use, it is connected movably with the support. Herein the free ends of its arms are hinged or pivoted to the opposite sides or ears of a U-shaped bracket or casting 7, the latter being provided with a base by means of which it is attached to an elevated portion of support 5. The closed end or bight 9 of the said loop or bail engages with the periphery of the tire of wheel 8 at a point on the latter about diametrically opposite the position of bracket or casting 7, while the opening of the latter also receives a portion of the tire or rim and tire of the wheel. Thus the elevated front wheel of the bicycle is held so that the bicycle is sustained against lateral movement and from overturning backwardly. The transverse inclination at which the respective bails or loops stand with relation to the support 5 in order to secure the desired overlapping of projecting portions of adjoining bicycles is shown clearly in Figs. 1 and 2.

10 designates a rest on which the rear wheels of the up-ended bicycles bear, and 11 designates a lower bicycle-holder which is applied to the support 5. This lower bicycle-holder 11 is made of U shape to receive portions of the rear wheel of a bicycle and is furnished with a suitable base for attachment to the support 5.

Preferably I form the truck of knockdown or folding construction in order that it may occupy but little space during transportation or when not in use and simply being stored away. In the present instance I have contrived the upright support 5 to fold upon itself transversely, so as to lie flatly upon the base 1 and occupy but little space vertically. Thus the said upright support is hinged at 12 12 to the base 1 to enable the lower portion thereof to be turned down upon the base 1. It is again hinged at 13 13 at about one-third its height to enable its upper part to fold oppositely upon the lower part thereof. To stiffen the joints at 13 13 when the upright support is desired to stand erect for service, a suitable locking means is provided—as, for instance, a swinging hook 14, connected pivotally to the upper part of the support 5 and engaging an eye 15, applied to the lower part of the support. Brace-rods 16 16 also are pivoted to base 1 and furnished with hooked upper ends that are caused to engage with eyes at 17 upon the upright support 5 in order to sustain the latter in its erect position. After disengaging the said braces and hook 14 the said upright support may be folded down upon the base 1 and upon itself into compact compass.

I claim as my invention—

1. A portable truck for use in transporting bicycles short distances, constructed to receive thereon a series of bicycles side by side in erect position, and provided with supports to engage with elevated portions of such bicycles to maintain them in the said position, substantially as described.

2. A portable truck provided with a series of elevated supports to engage the uplifted wheels of a series of up-ended bicycles and thereby retain said bicycles in said position and also from overturning and from lateral movement relatively to one another while being shifted by means of the said truck.

3. A portable truck provided with an upright support having thereon a plurality of holders to engage the wheels of a series of up-ended bicycles, said upright support being secured to the said truck by hinges thereby permitting the support to be placed in a horizontal position when not in use.

4. A portable truck provided with an upright support having thereon a plurality of holders to engage the wheels of a series of up-ended bicycles, said upright support being formed in two portions secured together by hinges and the lowermost of said portions being secured to the said truck by hinges whereby said upright support may be folded down upon said truck when not in use.

In testimony whereof I affix my signature in presence of two witnesses.

FRANK W. WHITCHER.

Witnesses:
  CHAS. F. RANDALL,
  CHAS. F. R. FOSS.